T. H. YOUNG.
AUTOMOBILE TIRE.
APPLICATION FILED NOV. 21, 1913.

1,146,381.

Patented July 13, 1915.

Witnesses

Thomas H. Young,
Inventor by
Attorneys

COLUMBIA PLANOGRAPH CO., WASHINGTON, D. C.

UNITED STATES PATENT OFFICE.

THOMAS HARVEY YOUNG, OF SALT LAKE CITY, UTAH.

AUTOMOBILE-TIRE.

1,146,381. Specification of Letters Patent. Patented July 13, 1915.

Application filed November 21, 1913. Serial No. 802,272.

*To all whom it may concern:*

Be it known that I, THOMAS H. YOUNG, a citizen of the United States, residing at Salt Lake City, in the county of Salt Lake and State of Utah, have invented a new and useful Automobile-Tire, of which the following is a specification.

This invention aims to provide a novel form of filler for a tire, and to provide novel means for tightening the tire around the filler.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
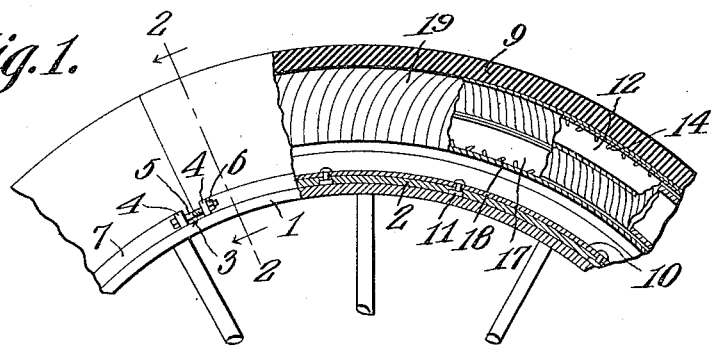
Figure 2:
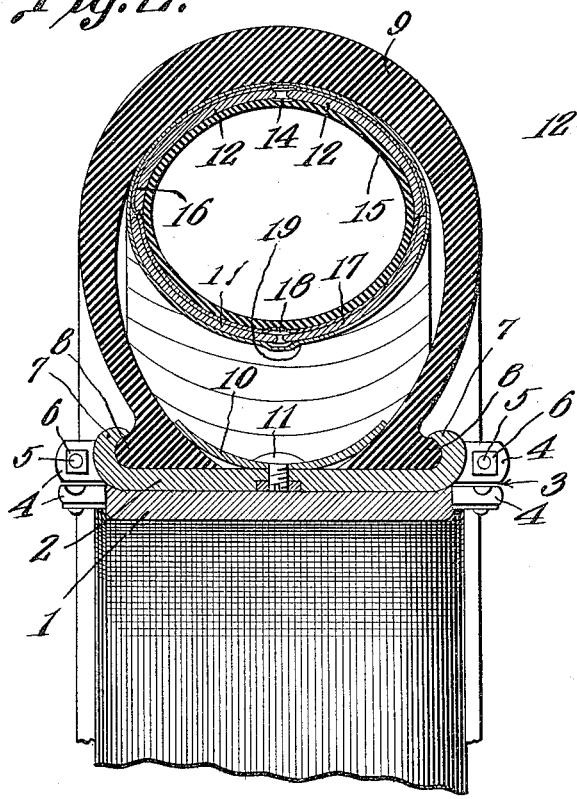
Figure 3:
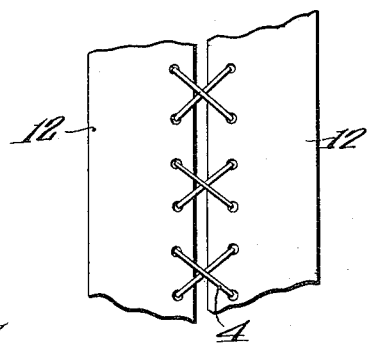
Figure 4:
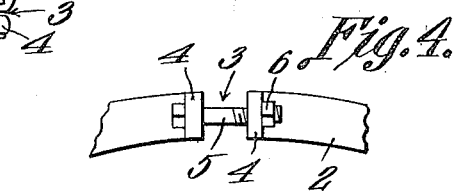

In the accompanying drawing:—Figure 1 is a side elevation showing a tire and filler constructed in accordance with the present invention, parts being broken away; Fig. 2 is a cross section on the line 2—2 of Fig. 1; Fig. 3 is a plan showing a portion of one pair of the connected strips which enter into the construction of the filler; Fig. 4 is a fragmental side elevation of the rim.

In the accompanying drawings the numeral 1 indicates a felly supporting a rim 2, divided as shown at 3. The ends of the rim 2 are provided each side with ears 4, and the ears 4 upon each side of the rim are connected by bolts 5 or other clamping means, the bolts 5 being provided with nuts 6. The rim 2 may be equipped with clencher flanges 7 coöperating with clench beads 8 upon a tire 9. A securing plate 10 of trough-shape, and co-extensive with the rim 2 is applied to the rim and is held thereon by means of securing elements indicated by the numeral 11. The plate 10 binds the tire 9 to the rim 2, so that when the ends of the rim are drawn together by the bolts 5, the tire will be contracted about a filler which will now be described.

The filler above referred to is located within the tire 9 and comprises diverging, transversely concaved outer steel plates 12 united along their longitudinal edges and adjacent the median plane of the tire by a lacing 14. The plates 12 thus define a trough in which is located a tube 15. The tube 15 may be fashioned from leather, rubber, canvas, or other material adapted to a like end but the tube 15, whatever may be its form, is relatively stiff. A wrapping 16 incloses the outer plates 12 and the tube 15. The filler further includes a pair of inner steel plates 17, the adjacent edges of which are connected along the median plane of the tire by a lacing 18. The plates 17 define a trough which is concaved, as Fig. 2 will render evident. The plates 17 and 12 preferably are fashioned from resilient metal. A wrapping 19 is passed around the inner plates 17, and around that portion of the wrapping which lies upon the outside of the outer plates 12. Thus the several plates are held together to form an approximately elliptical casing in which the tube 15 is located. The filler above described bears against the tread portion of the tire 9, but is spaced from the rim 2.

As stated hereinbefore the tire 9 may be tightened around the filler, circumferentially of the wheel, by manipulating the bolt and nut structures 5—6.

Having thus described the invention, what is claimed is:—

1. A tire support comprising a pair of outer strips and a pair of inner strips, the pairs of strips being disposed to form a tube, the edges of the strips of the respective pairs being loosely connected adjacent the median plane of the support only; a ring disposed within the tube; a wrapping inclosing the outer strips and the ring; and a wrapping inclosing the tube.

2. A tire support comprising a trough-shaped outer member and a trough-shaped inner member, the said trough-shaped members being disposed edge to edge to define a tube; a ring disposed within the tube; a wrapping inclosing the ring and the outer trough-shaped member; and a wrapping inclosing the tube.

In testimony that I claim the foregoing as my own, I have hereto affixed my signature in the presence of two witnesses.

THOMAS HARVEY YOUNG.

Witnesses:
W. B. THOMAS,
WM. E. NOSTRAM.

Copies of this patent may be obtained for five cents each, by addressing the "Commissioner of Patents, Washington, D. C."